United States Patent [19]
Brown et al.

[11] Patent Number: 5,471,499
[45] Date of Patent: Nov. 28, 1995

[54] MINIMUM SHIFT KEYED SAW DEVICE AND METHOD

[76] Inventors: Roy B. Brown, 456 Forestwood Ln., Maitland, Fla. 32751; Neal J. Tolar, 703 Blue Lake Dr., Longwood, Fla. 32779

[21] Appl. No.: 34,404

[22] Filed: Mar. 19, 1993

[51] Int. Cl.$^6$ .................................................. H04L 27/12
[52] U.S. Cl. ........................ 375/305; 375/274; 332/100; 333/193
[58] Field of Search ................................. 375/47, 64, 90; 332/100, 102; 329/300, 301; 333/150, 193, 195

[56] References Cited

U.S. PATENT DOCUMENTS

| | | | |
|---|---|---|---|
| 3,749,984 | 7/1973 | Benyon, Jr. et al. | 257/254 |
| 3,969,590 | 7/1976 | Jain et al. | 375/64 |
| 4,592,009 | 5/1986 | Masheff | 364/821 |
| 5,001,723 | 3/1991 | Kerr | 375/83 |
| 5,033,063 | 7/1991 | Okamoto et al. | 375/90 |

OTHER PUBLICATIONS

W. Richard Smith, "Saw Filters for CPSM Spread Spectrum Communication", IEEE Ultrasonics Symposium Proceedings, pp. (524–528) (1977).

Primary Examiner—Stephen Chin
Assistant Examiner—Don Vo
Attorney, Agent, or Firm—Allen, Dyer, Doppelt, Franjola & Milbrath

[57] ABSTRACT

A surface acoustic wave (SAW) device is described that comprises a piezoelectric medium using input and output transducers for launching and detecting a surface acoustic wave on the piezoelectric medium. In particular, a device is described that uses a special combination of transducers for the direct generation of a coded minimum shift keyed (MSK) waveform from an input impulse waveform. The same device is used for the direct detection of an input MSK waveform in order to generate an impulse waveform with sidelobe characteristics similar to those expected from a specific code. The SAW device provides the advantages of MSK encoded waveforms for spread spectrum applications and the advantage of implementing such entirely on a SAW substrate.

11 Claims, 3 Drawing Sheets

MINIMUM SHIFT KEYED SAW DEVICE AND METHOD

BACKGROUND OF THE INVENTION

1. Field of the Invention

The invention relates to surface acoustic wave (SAW) devices and methods, and specifically to devices and methods for achieving direct generation and detection of a coded minimum shift keyed (MSK) waveform.

2. Background

Surface acoustic wave devices are well known in the art. Typically, a SAW device is characterized by an input interdigital transducer (IDT) arranged on a piezoelectric surface with an output transducer spaced from the input transducer for detecting and processing a surface acoustic wave launched by the input transducer along the piezoelectric surface. A number of electronic signal processing functions have been devised using a variety of circuits incorporating SAW devices. In particular, the use of SAW filters has become a preferred method for implementing continuous phase shift modulation in spread-spectrum communication systems.

U.S. Pat. No. 3,969,590 issued to Anant K. Jain and Robert K. Marston on Jul. 13, 1976 and assigned to the Rockwell International Corporation discloses a modulating system using a SAW device for receiving impulses and providing shaped carrier signals as an output for transmitting data. The apparatus teaches the use of a SAW device as a means of producing specific outputs in the form of a modulated signal and specifically teaches the application of an impulse to the device to produce a MSK modulated output without the use of auxiliary phase lock loops, balanced modulators or other means typically required of such signal modulation devices not incorporating SAW techniques. In the device disclosed, a phase shift keyed (PSK) waveform is digitally generated first and then a SAW filter is used to convert the PSK waveform to an MSK waveform.

U.S. Pat. No. 4,592,009 issued to Michael S. Masheff on May 27, 1986 and assigned to E-Systems, Inc. discloses an MSK SAW convolver for use in a communications system in which a signal input incorporates a mixed pseudo noise (PN) code sequence and narrow band information signal phase modulated thereon according to an MSK modulated scheme. The convolver includes a piezoelectric substrate SAW device having a first transducer formed on the top surface for receiving a signal and generating acoustic surface waves along a first direction. A second transducer is also formed on the top surface for receiving a reference signal and in response generating acoustic surface waves along a second direction. The reference signal incorporates the PN code sequence phase-modulated thereon according to a bi-phase shift keying (BPSK) modulation scheme. A BPSK-MSK converter integrally formed on the substrate produces the reference signal in MSK form.

U.S. Pat. No. 5,033,063 issued to Takeshi Okamoto and Shoichi Minagawa on Jul. 16, 1991 and assigned to the Clarion Co. Ltd. also discloses a SAW device for use in spread-spectrum communications. The patent teaches a SAW device comprising at least two SAW transducers made from metal and disposed along the surface acoustic wave propagating direction on a piezoelectric substrate. At least one of the transducers has a different bandwidth and a convolver output gate electrode in the form of a rectangular metal layer placed between the transducers. Both this patent and the Masheff U.S. Pat. No. 4,592,009 described above use schemes in which a PSK waveform is generated digitally and then converted to an MSK waveform by a SAW transducer embedded alongside a SAW convolver used to detect the received MSK waveform.

The fact that MSK modulated spread spectrum waveforms consisting of a sequence of contiguous pulses, each of which is a short burst at one of two different frequencies, have the advantage of lower spectral side lobes and thus lower cross-channel interference than do PSK waveforms is well known in the art. As described by W. Richard Smith of the Hughes Aircraft Company, Fullerton, Calif. in a paper presented during a 1977 IEEE Ultrasonic Symposium Proceedings, progress in coded, spread-spectrum communication systems has shown the need to avoid spillage of energy from one communication channel into the frequency bands allocated for adjacent and nearby communication channels. It is pointed out that this is a principal reason for using MSK waveforms, also known as continuous phase shift modulated (CPSM) waveforms, for direct sequence coding in spread spectrum communication systems. Smith discloses an MSK modulator using a SAW filter. In the scheme disclosed, an input coded pulse train is mixed with a carrier wave to produce a PSK waveform. The PSK waveform then becomes the input to the SAW filter to produce an MSK waveform. Smith concludes that the use of SAW filters will undoubtedly become the method of choice for implementing MSK modulation. Their simplicity reduces the size and cost, and by virtue of lacking critical time alignment problems, they have allowed MSK waveforms to be generated at higher carrier frequencies than previously possible.

SUMMARY OF INVENTION

A surface acoustic wave (SAW) device comprises a piezoelectric medium having an input means provided on the medium. The input transducer launches a surface acoustic wave in response to an input pulse waveform. An output transducer provided on the medium detects the surface acoustic wave so as to provide means of direct generation of a minimum shift-keyed (MSK) waveform. The device further provides for the direct detection of input MSK waveforms.

In the preferred embodiment, the SAW device comprises the piezoelectric medium having an input transducer of length equal to one bit code length. The input transducer has a characteristic center frequency defined by the sum of the input waveform frequency and the reciprocal of four times the bit code length. The output transducer provided on the medium is capable of detecting the surface wave generated by the input transducer. The output transducer has a center frequency defined by the difference of the waveform frequency and the reciprocal of four times the bit code length. The length of the output transducer is equal to the code bit length times the number of predetermined code bits employed in the use of the specific SAW device.

In the preferred embodiment the output transducer comprises fingers that follow a phase modulation of the bit code. The fingers in the output transducer are substantially over the entire length of the transducer. In an alternate embodiment, the output transducer is split into a plurality of cascaded transducers along the length of the transducer so as to optimize the effective electrical impedance of the transducer.

A method for the direct generation of a coded minimum shift-keyed (MSK) waveform from an impulse waveform comprises the step of providing a piezoelectric substrate with an input transducer having a length equal to one code bit and a characteristic center frequency equaling the sum of the input signal waveform frequency and the reciprocal of four times the code bit length. The first transducer launches a surface acoustic wave. By affixing a second transducer on the substrate and dimensioning the second transducer with a length equal to a predetermined number of code bits times the code bit length and with a center frequency equal to the difference of the waveform frequency and four times the reciprocal of the code bit length, the second transducer receives the launched surface wave. Receiving the surface acoustic wave launched by the first transducer, the second transducer emits a minimum shift-keyed waveform.

It is an object on the invention to provide a single SAW device which receives an impulse waveform and directly generates a coded MSK waveform. By directly generating the MSK waveform, no digital generation is needed and there is no need for a second SAW device to convert a phase shift keyed (PSK) waveform to an MSK waveform.

The invention is realized by combining characteristics of a SAW device used for PSK code generation with those characteristics of a SAW device used to convert a PSK waveform to an MSK waveform. In an alternate use of the preferred embodiment, the invention is used as a matched filter for the direct detection of an input MSK waveform. In this alternate use, the device generates an impulse waveform with sidelobe characteristics similar to those expected from a specific predefined code.

BRIEF DESCRIPTION OF DRAWINGS

A preferred embodiment of the invention as well as alternate embodiments are described by way of example with reference to the accompanying drawings in which:

FIG. 2b is a frequency spectrum of the PSK waveform illustrated in FIG. 2a.

FIG. 3b is a frequency spectrum of the MSK waveform illustrated in FIG. 3a.

DETAILED DESCRIPTION OF PREFERRED EMBODIMENT

Figure 1:
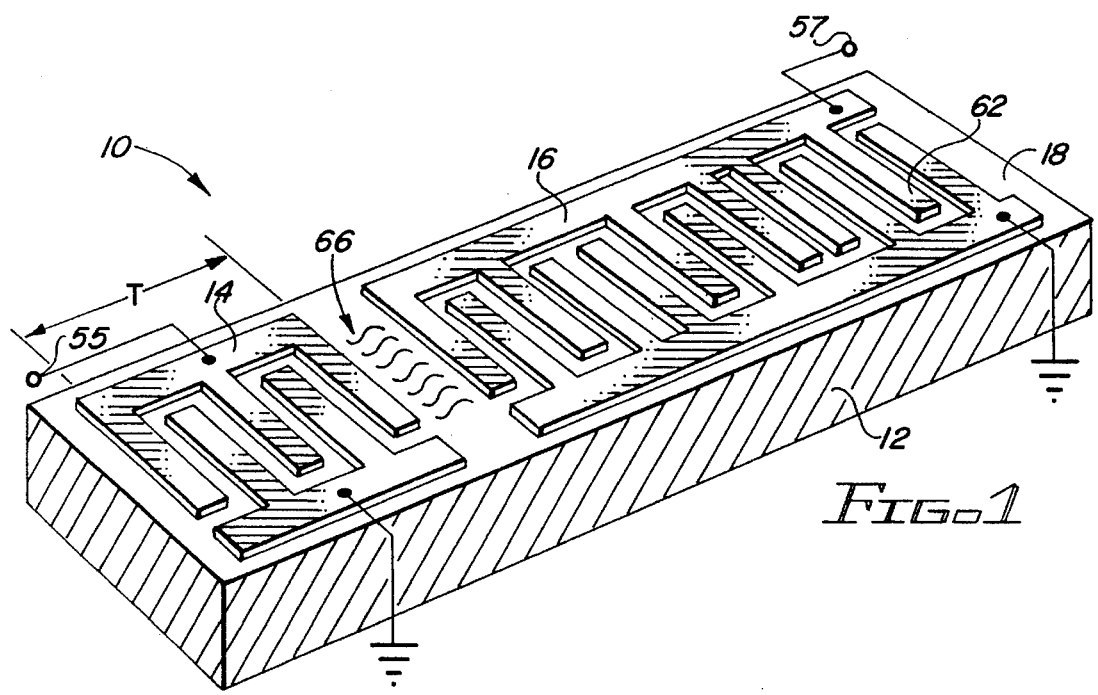
FIG. 1 is a schematic illustration of a surface acoustic wave (SAW) device in accordance with the present invention.

The preferred embodiment of the invention is a SAW device 10 in a piezoelectric medium 12 using an input transducer 14 and an output transducer 16 for launching and detecting a surface acoustic wave on a surface 18 of the piezoelectric medium 12. FIG. 1 is a schematic illustration of the SAW device 10 in accordance with the present invention.

Figure 2A:
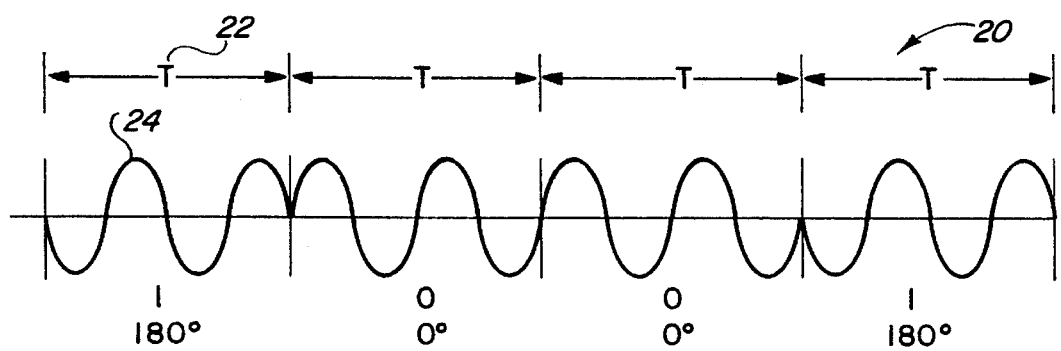
FIG. 2a is conventional biphase phase shift keyed (PSK) waveform illustrative of a four bit code.
Figure 2B:
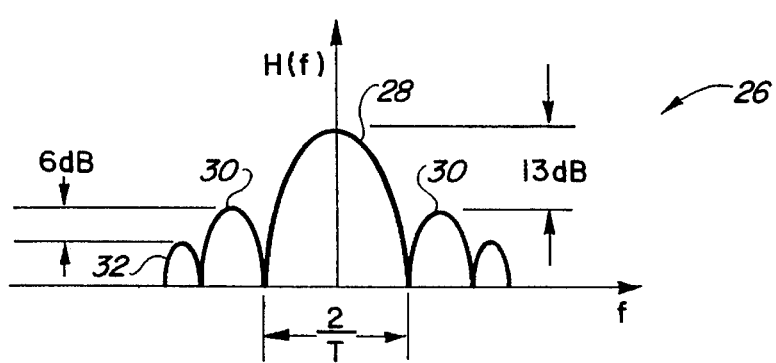

In the conventional phase-shift-keyed (PSK) waveform 20 illustrated in FIG. 2a, the waveform 20 consists of a contiguous sequence of short chips 22 of duration T with a constant instantaneous frequency throughout the waveform 20. As described in the IEEE Smith paper referred to above, a pseudo-random code is applied to the waveform 20 by applying 180 phase reversals to the carrier wave 24 in some of the chips 22 so that each chip 22 represents a one or a zero according to its phase. The frequency spectrum 26 associated with the PSK waveform 20 of this PSK waveform is illustrated in FIG. 2b. Its envelope 28 is the Fourier transform of one chip 22 of the waveform 20 and is described by a sin x/x function centered on the carrier frequency and having a null-to-null bandwidth of 2/T. In this typical PSK waveform spectrum 26, the nearest sidelobes 30 of the envelope 28 are down by 13 dB and the remaining sidelobes 32 decrease at a relatively slow rate of 6 dB per octave. As is known in the art, it is the energy contained in the first several spectral sidelobes that often leads to interference with systems operating at nearby frequencies.

Figure 3A:
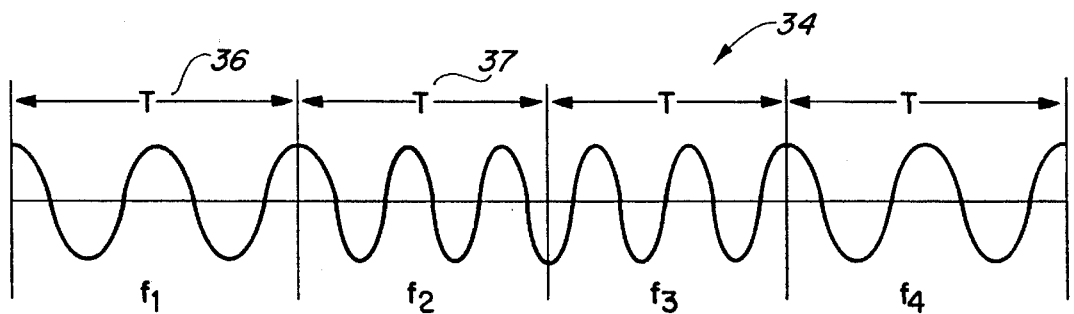
FIG. 3a is a section of a continuous phase shift modulated (CPSM) spectrum also known in the art as a minimum shift keyed (MSK) waveform.
Figure 3B:
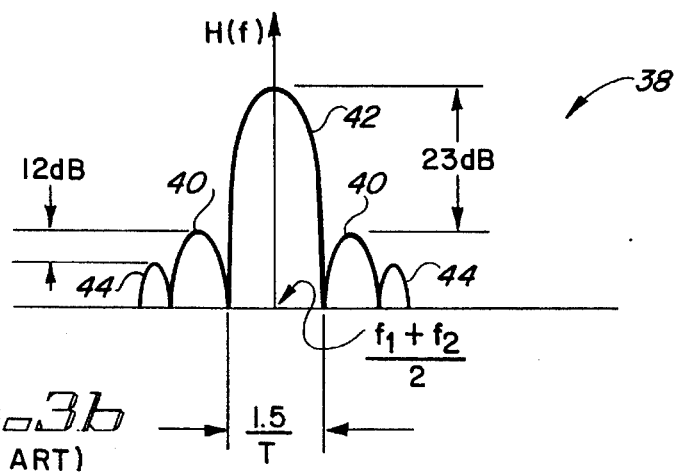

As illustrated in FIG. 3a, continuous phase shift modulated (CPSM) spread spectrum waveforms also referred to as minimum shift-keyed (MSK) waveforms 34 as used in the present description consists of a sequence of continuous chips 36 of duration T. For the MSK waveform 34, there are no phase shifts as in the PSK waveform 20 of FIG. 2a. The instantaneous frequency of the carrier 38 takes on values $f_1$ in some chips 36 and a different frequency value $f_2$ in other chips 37. The differing frequencies are generated in a pseudo-random sequence and the phase of the waveform 34 is everywhere continuous and so is its first time derivative. The smoother nature of the MSK waveform 34 leads to the frequency spectrum 38 illustrated in FIG. 3b. For the MSK waveform 34, the frequency spectrum 38 has the first sidelobes 40 of the envelope 42 down by 23 dB and the subsequent sidelobes 44 decreasing by 12 dB or double that of the PSK spectrum 26. In addition, a narrower null-to-null bandwidth of 1.5/T reduces inter-channel interference.

Figure 4:
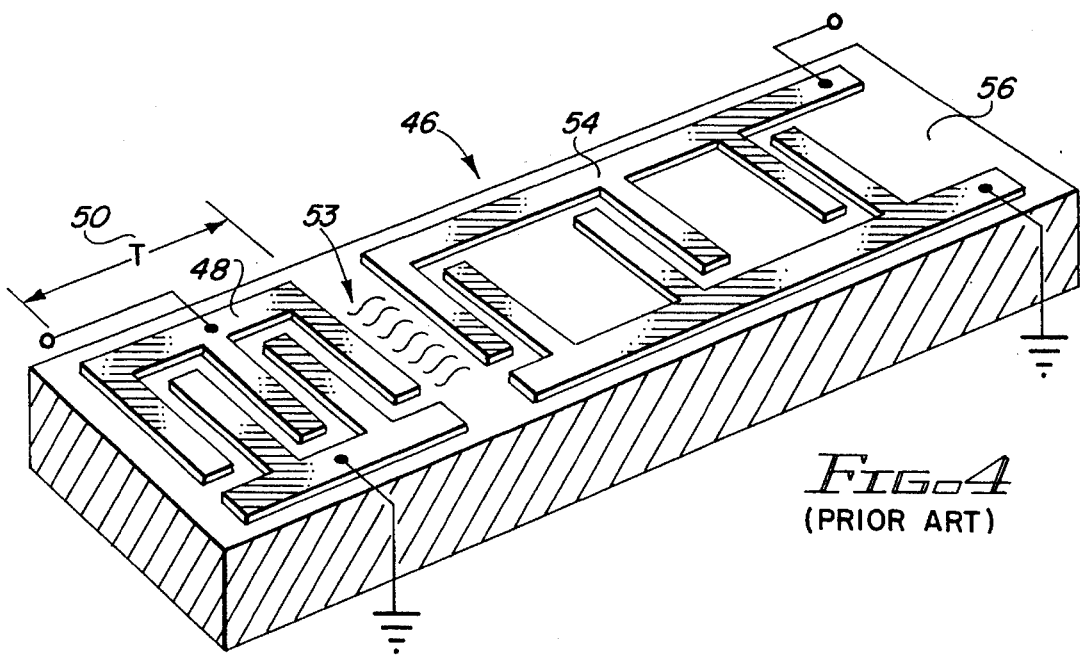
FIG. 4 is a schematic illustration of a PSK waveform SAW device well known in the art.
Figure 5:
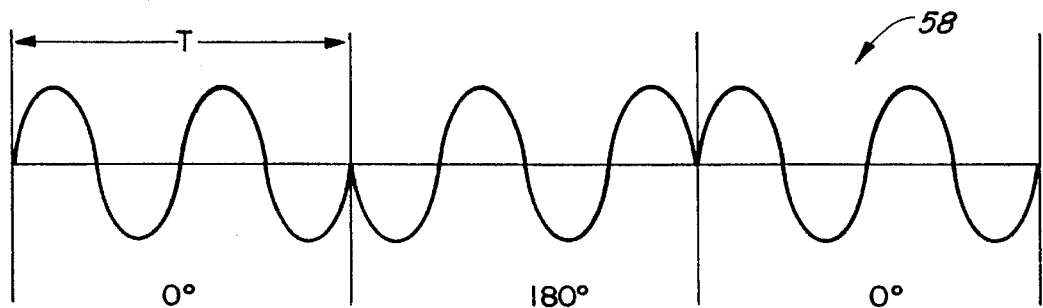
FIG. 5 is a PSK waveform generated by the device illustrated in FIG. 4.
Figure 6:
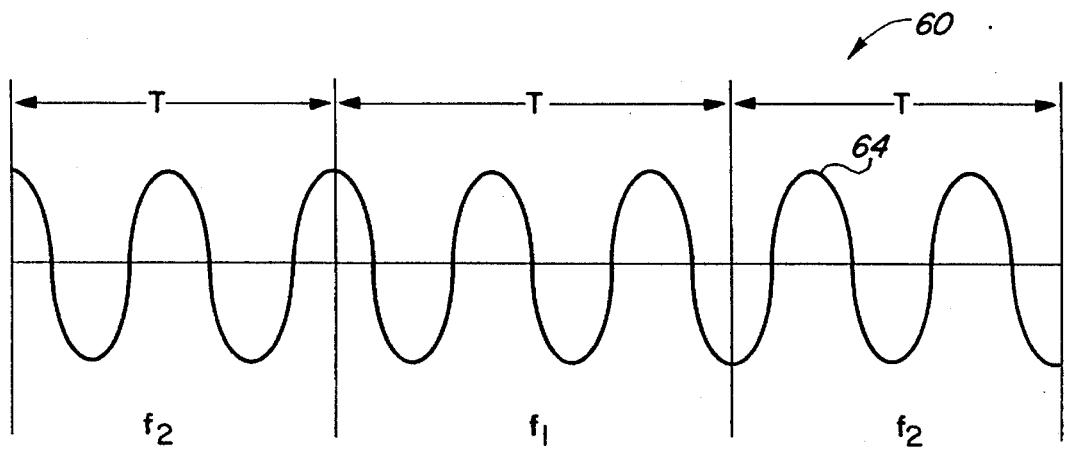
FIG. 6 is an MSK waveform generated by the SAW device of the present invention.

In a typical PSK device 46 as illustrated in FIG. 4, a short input transducer 48, has a length 50 equal to one chip as illustrated in FIG. 4. The transducer 48 launches a surface wave 53 to a longer transducer 54 which has a finger structure 56 that follows the phase modulation characteristics of a particular code. Typically in the art, if the input transducer 48 is the length of one code bit or chip 50, then the longer transducer 54 would only have active fingers 56 over a portion of the transducer 54 as is illustrated in FIG. 4. This configuration prevents distortion of the waveform. The typical PSK waveform 58 for the three chip device 46 of FIG. 4 is illustrated in FIG. 5. As is well known in the art, a PSK waveform can be generated digitally as disclosed in the patents referred to in the Background Section of this specification. As discussed, once generated, the PSK wave form is used as the input to another SAW filter device. The SAW device 10 schematically illustrated in FIG. 1 is capable of directly receiving an impulse at an input terminal 55 and generating an MSK waveform 60 at an output terminal 57 as illustrated in FIG. 6.

The present invention can best be understood by viewing it as a device 10 for performing both the generation of a PSK waveform 58 and performing the conversion of the PSK waveform 58 to an MSK waveform 60 within the device 10 itself. With reference again to FIG. 1, the short or input transducer 14 generates a carrier waveform output in response to an impulse input. The long or output transducer 16 generates the MSK waveform in response to the carrier waveform. The carrier waveform output from the first transducer has a center frequency defined by the first transducer. Since the entire MSK waveform 60 is generated on one transducer, all active fingers 62 for one chip must be present in order to have a constant amplitude waveform 64. The input transducer 14 used to launch the surface acoustic wave 66 has a length equal to one code bit or chip having a chip length T.

This input transducer 14 also has a center frequency defined by:

$$f_1 = f_0 + \frac{1}{4}T$$

where f0 is the input carrier waveform frequency and T is the chip length as described. The output transducer 16 has a length equal to the number of chips times the length of one chip. In the embodiment, three chips or code bits are illustrated. In addition, the output transducer 16 has a center frequency defined by:

$$f_2 = f_0 - \frac{1}{4}T$$

where f0 and T are as defined above. For input impulses of short duration compared to the input transducer length, f0 is the average of the transducer center frequencies. The output transducer 16 must also have active fingers 62 substantially throughout the transducer 16 length. As illustrated in FIG. 1 as the preferred embodiment of the invention, the output transducer 16 has a finger 62 structure that follows the phase modulation of the code being used. Coding takes place in the output transducer. In addition to generating an MSK waveform at the output terminal 57 in response to a single impulse at the input terminal 55, the present invention further provides for direct detection of an input minimum shift keyed (MSK) waveform and the generation of a single impulse waveform having characteristics expected from a specific code.

Figure 7:
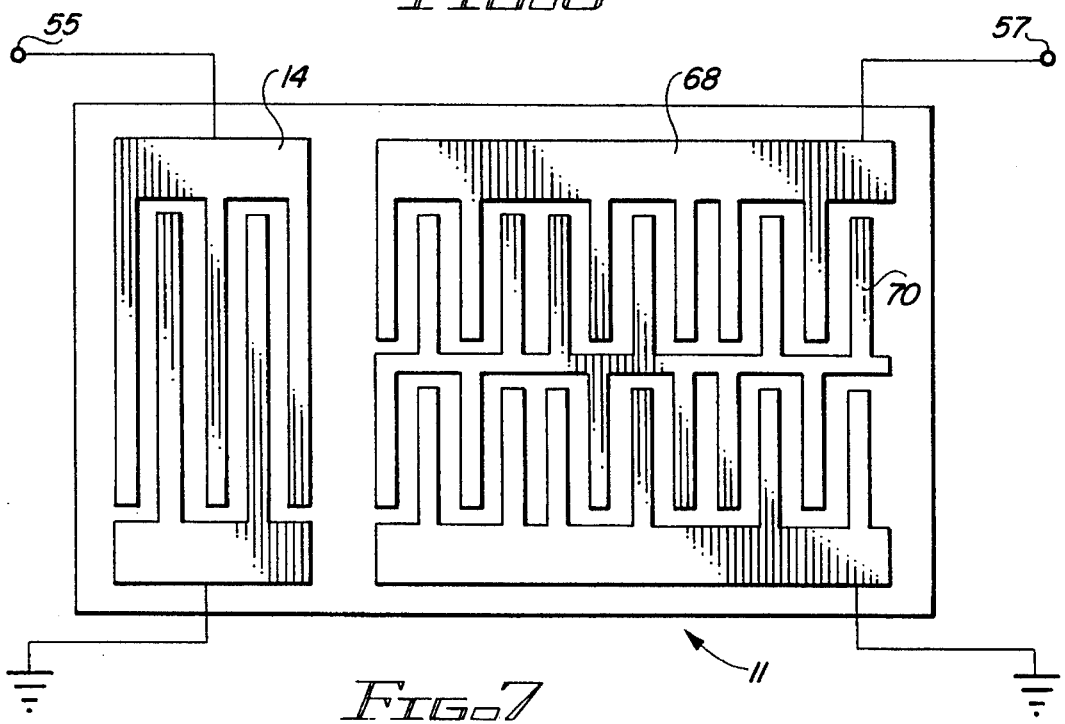
FIG. 7 is a schematic illustration of an alternate embodiment of the SAW device of the present invention for the generation of an MSK waveform.

In an alternate embodiment of the SAW device 11, as illustrated in FIG. 7, the output transducer 68 is split along its length into a plurality of narrower cascaded transducers 70. Two are illustrated in FIG. 7. This cascaded configuration has the effect of reducing transducer capacitance and conductance.

This concludes the description of the preferred embodiments. A reading by those skilled in the art will bring to mind various changes without departing from the spirit and scope of the invention. It is intended, however, that the invention only be limited by the following appended claims.

What is claimed is:

1. A surface acoustic wave (SAW) device comprising:

a piezoelectric medium;

an input transducer provided on the medium having a length equal to one code bit length, the input transducer for receiving an impulse input and launching a surface acoustic wave, the input transducer also having a characteristic center frequency defined by the sum of the input waveform frequency and the reciprocal of four times the code bit length, the surface wave having a center frequency defined by the input transducer; and an output transducer for detecting the launched surface acoustic wave and providing a minimum shift-keyed waveform, the output transducer having a length equal to a predefined number of code bits times the code bit length, the output transducer having a finger structure that follows a phase modulation of the bit code, the output transducer further having a characteristic center frequency equal to the difference between the input waveform frequency and the reciprocal of four times the code bit length.

2. A SAW device as recited in claim 1 wherein the output transducer comprises active fingers substantially over the transducer length.

3. A SAW device as recited in claim 1 wherein the output transducer is divided along the length into a plurality of cascaded transducers.

4. A surface acoustic wave (SAW) device useful in the direct generation of a coded minimum shift-keyed (MSK) waveform from an input impulse waveform, the SAW device comprising:

a piezoelectric substrate;

a first transducer provided on the substrate, the first transducer having a length of one code bit, the first transducer further having a characteristic center waveform frequency defined by the sum of an input waveform frequency and a reciprocal of four times the code bit length; and a second transducer provided on the substrate, the second transducer positioned for receiving a surface acoustic wave initiated by the first transducer, the surface acoustic wave generated in response to an input impulse waveform received by the first transducer, the second transducer having a length equal to a predefined number of code bits times the code bit length, the second transducer length substantially comprising active fingers, the second transducer further having a characteristic center waveform frequency defined by a difference between the input waveform frequency and the reciprocal of four times the code bit, wherein a minimum shift-keyed (MSK) output waveform is generated by the second transducer in response to the input impulse waveform at the first transducer.

5. A SAW device as recited in claim 4 wherein the second transducer comprises a finger structure that follows a phase modulation of the bit code.

6. A SAW device as recited in claim 4 wherein the second transducer comprises active fingers substantially over the transducer length.

7. A SAW device as recited in claim 4 wherein the output transducer is divided along the length into a plurality of cascaded transducers.

8. A method for the direct generation of a coded minimum shift-keyed (MSK) waveform from an impulse waveform, the method comprising the steps of:

providing a piezoelectric substrate;

imposing an input impulse waveform to a first transducer affixed on the substrate, the first transducer having a length substantially equal to one code bit, the first transducer having a characteristic center frequency equaling the sum of the input waveform frequency and the reciprocal of four times the code bit length;

launching a surface acoustic wave from the first transducer over the substrate;

receiving the surface acoustic wave by a second transducer on the substrate, the second transducer having a length equal to a predetermined number of code bits times the code bit length, the second transducer having active fingers substantially across its length and a characteristic center frequency equaling a difference between the input signal waveform frequency and the reciprocal of four times the code bit length; and emitting a minimum shift-keyed waveform from the second transducer in response to the imposed single input impulse waveform at the first transducer.

9. A method as recited in claim 8 further comprising the steps of receiving the minimum key-shift waveform at the second transducer and emitting the impulse waveform at the first transducer with characteristics expected from a predetermined code.

10. A method as recited in claim 8 wherein the step of affixing a second transducer further comprises the second transducer divided along a transducer length into a plurality of cascaded transducers.

11. A surface acoustic wave (SAW) device useful in the direct generation of an impulse waveform from an input coded minimum shift-keyed (MSK) waveform, the SAW device comprising:

a piezoelectric substrate;

a first transducer provided on the substrate, the first transducer having a length of one code bit, the first transducer further having a characteristic center waveform frequency defined by the sum of an input waveform frequency and a reciprocal of four times the code bit length; and a second transducer provided on the substrate, the second transducer positioned for receiving a surface acoustic wave initiated by the first transducer, the surface acoustic wave generated in response to an input waveform received by the first transducer, a second transducer having a length equal to a predefined number of code bits times the code bit length, the second transducer length substantially comprising active fingers, the second transducer further having a characteristic center waveform frequency defined by a difference between the output waveform frequency and the reciprocal of four times the code bit wherein an impulse output waveform is generated by the second transducer in response to the input minimum key-shift (MSK) waveform delivered to the first transducer.

* * * * *